US005095422A

United States Patent [19]
Horiguchi

[11] Patent Number: 5,095,422
[45] Date of Patent: Mar. 10, 1992

[54] INFORMATION TRANSFERRING METHOD AND APPARATUS FOR TRANSFERRING INFORMATION FROM ONE MEMORY AREA TO ANOTHER MEMORY AREA

[75] Inventor: Ryuji Horiguchi, Tokyo, Japan

[73] Assignee: NEC Corporation, Tokyo, Japan

[21] Appl. No.: 547,410

[22] Filed: Jul. 2, 1990

Related U.S. Application Data

[63] Continuation of Ser. No. 30,644, Mar. 27, 1987, abandoned.

[30] Foreign Application Priority Data

Mar. 27, 1986 [JP] Japan .................................. 61-70116

[51] Int. Cl.[5] .............................................. G06F 12/04
[52] U.S. Cl. .................................... 395/425; 340/727; 364/237.2; 364/239.3; 364/DIG. 1
[58] Field of Search ... 364/200 MS File, 900 MS File, 364/518, 521; 382/46; 340/727

[56] References Cited

U.S. PATENT DOCUMENTS

| | | | |
|---|---|---|---|
| 4,168,488 | 9/1979 | Evans | 340/727 |
| 4,545,069 | 10/1985 | Kermisch | 340/727 |
| 4,554,638 | 11/1985 | Iida | 364/521 |
| 4,593,407 | 6/1986 | Konishi et al. | 364/900 |
| 4,627,020 | 12/1986 | Anderson et al. | 364/900 |
| 4,635,212 | 1/1987 | Hatazawa | 364/518 |
| 4,636,783 | 1/1987 | Omachi | 340/727 |
| 4,706,205 | 11/1987 | Akai et al. | 364/518 |
| 4,706,213 | 11/1987 | Bandai | 364/900 |
| 4,716,533 | 12/1987 | Ohmori | 364/518 |
| 4,736,442 | 4/1988 | Kornfield | 340/727 |
| 4,747,042 | 5/1988 | Ishii et al. | 364/518 |
| 4,768,157 | 8/1988 | Chauvel et al. | 364/521 |
| 4,776,026 | 10/1988 | Ueyama | 340/727 |
| 4,829,294 | 5/1989 | Iwami et al. | 364/521 |

OTHER PUBLICATIONS

"Image Processing System", IBM Technical Disclosure Bulletin, vol. 28, No. 7, Dec. 1985, pp. 3063-3065.

Primary Examiner—Joseph A. Popek
Assistant Examiner—Rebecca L. Rudolph
Attorney, Agent, or Firm—Sughrue, Mion, Zinn, Macpeak & Seas

[57] ABSTRACT

An information transfer from a first memory area to a second memory area is performed via a subsidiary memory. The information is read out of the first memory area by an upper portion of a first address designating the first memory area and is written into the subsidiary memory by a lower portion of a second address designating the second memory area. Thereafter, the information written into the subsidiary memory is read out thereof by a lower portion of the first address and is written into the second memory area by an upper portion of the second address. Thus, the information of the first memory area is rotated and transferred to the second memory area without shifting.

8 Claims, 9 Drawing Sheets

INFORMATION TRANSFERRING METHOD AND APPARATUS FOR TRANSFERRING INFORMATION FROM ONE MEMORY AREA TO ANOTHER MEMORY AREA

This is a continuation of application Ser. No. 07/030,644 filed Mar. 27, 1987 now abandoned.

BACKGROUND OF THE INVENTION

This invention relates to an information transferring method and apparatus for transferring information stored in a memory area to another memory area, and particularly to a method and apparatus for rotating information of a memory area and transferring a rotated information to another memory area.

The above method and apparatus is used, for example, in an image processing field. When information displayed on a location of a screen is moved to another location, information stored in a video memory must be transferred from a source area, in which information to be transferred is stored, to a destination area by using a memory to memory transferring method. In a case information of a plurality of bits is transferred, a long period of time must be spent if the information is transferred bit by bit therefore, a block transfer by which a plurality of bits can be transferred altogether is effective. To perform the block transfer, the video memory is accessed word by word by word addresses.

However, when a boundary of the source area or the destination area does not coincide with a boundary of an accessed word, heretofore a shifting operation for shifting a bit location in the word has been used to adjust the word to the source area or the destination area. This shifting operation is required for each word, so that a high-speed block transfer cannot be performed. Further, since a lower bit or bits of a shifted word stick out an adjacent word, a writing operation for the destination area is difficult as described hereinafter. Particularly, when information in the source area is rotated, a bit-boundary in a word is varied by a rotator, so that the above shifting operation becomes more complex.

SUMMARY OF THE INVENTION

It is an object of the present invention to provide a method and apparatus for transferring information from a source area to a destination area at a high speed, and particularly to a method and apparatus suitable for a block transfer and a rotation operation.

An information transferring apparatus of the present invention comprises a first memory including a source area in which information to be transferred is stored and a destination area for storing a transferred information therein, a second memory coupled to the first memory and temporarily storing the information read out of the source area, and a control circuit coupled to said first and second memories. The control circuit has a first means for reading the information out of the source area in the first memory word by word, a second means for writing the information into the second memory word by word by using an address designating the destination area, a third means for reading the information out of the second memory word by word by using an address designating the source area, and a fourth means for writing the information into the destination area.

An information transferring method of the present invention comprises the steps of reading information out of a source area in a first memory word by word by applying upper bits of a source address to the first memory, writing the information read out of the source area into a second memory word by word by applying lower bits of a destination address to the second memory, reading the information out of the second memory word by word by applying lower bits of the source address, and writing the information read out of the second memory into the destination area of the first memory by applying upper bits of the destination address to the first memory.

According to the present invention, information of the source area is transferred to the destination area via the second memory (subsidiary memory) without a shifting operation. That is, the information of the source area is directly written into the second memory word by word, and the information read out of the second memory is directly written into the destination area, so that the information can be transferred from the source area to the destination area at a high speed by using no shifting circuit. Particularly, the present invention is effective when the information in the source area is rotated and transferred to the destination area as described hereinafter.

DESCRIPTION OF THE PRIOR ART

Figure 1:
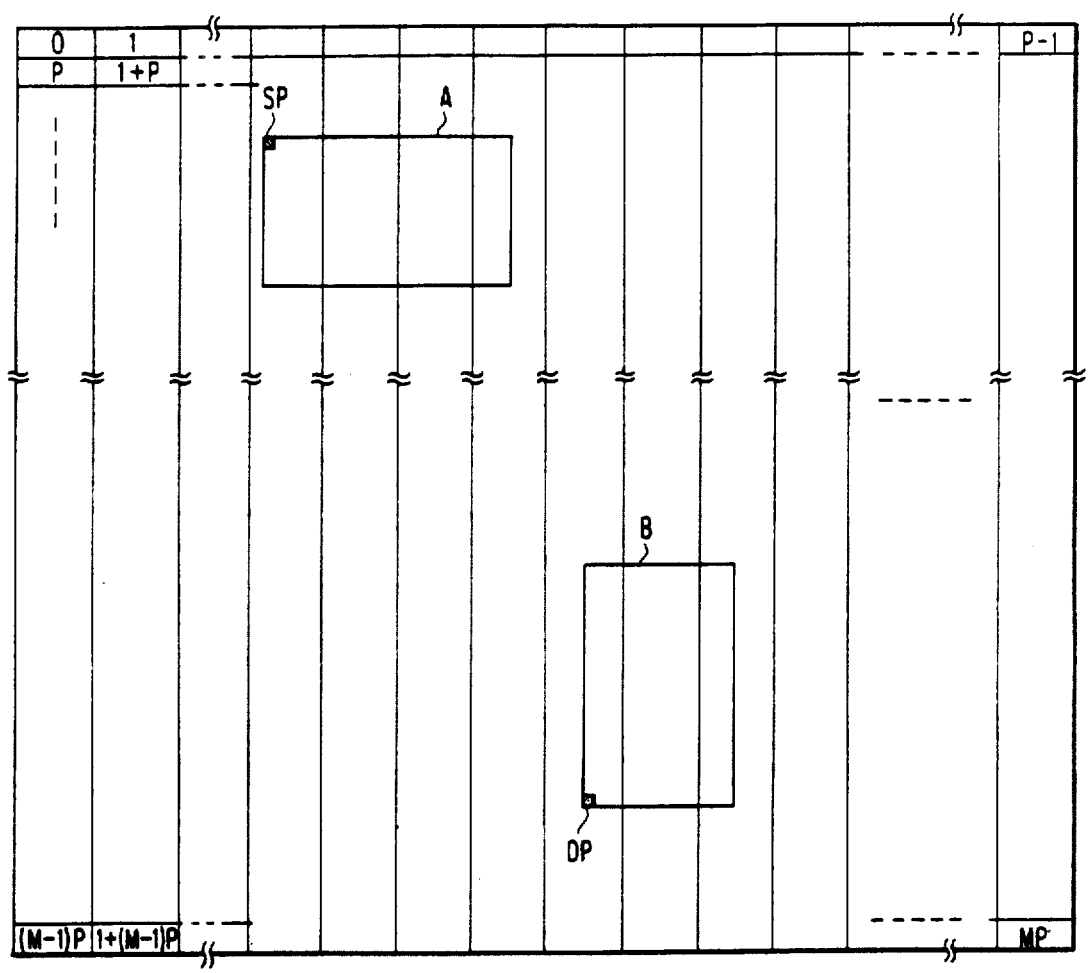
FIG. 1 is a diagram showing a video memory.

As shown in FIG. 1, a video memory has a memory map with P words ×M words, each word consisting of N bits. Each bit in the video memory is designated by a video memory address whose upper bits are used as a word address addressing a word and lower bits are used as a bit address addressing a bit in the word addressed by the word address.

Now, when information in a source area A is rotated counterclockwise by 90° and is transferred to a destination area B, the source area A is divided into a plurality of blocks, each block consisting of N×N bits, that is, N words. Since the video memory is accessed word by word, a bit at the upper-left position (SP) of the source area A is included in a block A0 and is transferred to a lower-left position (DP) of the destination area B.

Figure 2:
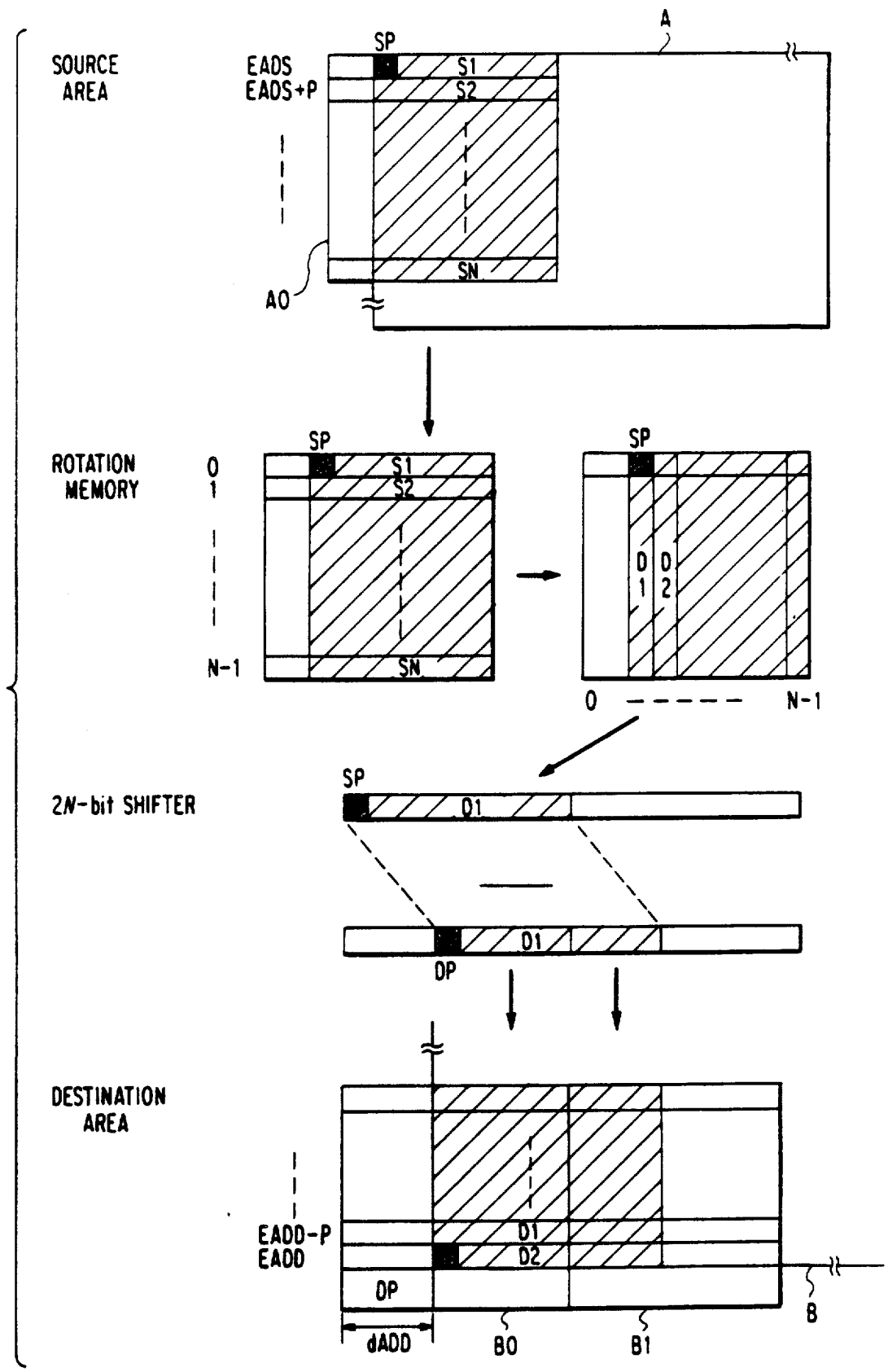
FIG. 2 is a diagram showing a block transfer according to the prior art.

FIG. 2 shows a block transfer of the prior art by which the block A0 is rotated counterclockwise by 90° and is transferred to the destination area B. The bit position SP is designated by a word address (EADS) and a bit address (dADS). Each word of the block A0 is successively read out of the video memory by a word address EADS, EADS+P, EADS+2P, . . . , EADS+(N−1)P, respectively, and is sequentially written into the rotation memory in a column direction according to a column address 0 to N, respectively. In the information written into the rotation memory, effective information included in the source area A are S1 to SN. Thereafter, the rotation memory is accessed by a row address 0 to N, so that each word in a row direction is read out of the rotation memory, respectively. The read-out word is entered into an upper N-bit portion of a 2N-bit shifter. When an effective word D1 is entered into the shifter, this word is shifted in right direction. A number of bits to be shifted is determined by a bit address (dADD) at a bit position (DP) in the destination area B. The shifted word D1 is written into the destination area B. At this time, lower bits of the word D1 are shifted out the adjacent word. The shifted word is written into the video memory by a word address (EADD) of destination area B. However, the shifter-out bits of the word D1 can not be written into the block B0, and therefore they must be written into the adjacent block B1 by a word address (EADD+1). This operation has to be performed in each word of the block A0. Thus, the information of the block A0 is rotated by 90° and is transferred to the destination area B.

As described above, according to the prior art the shifting operation with the 2N-bit shifter is required, and the writing operation for the destination area must be performed twice per one word. Further, when an information is written into the right portion of the block B1, the information previously written into the left portion of the block B1 must be masked. Therefore, a mask operation and a mask circuit are also required.

DETAILED DESCRIPTION OF THE EMBODIMENTS OF THE PRESENT INVENTION

Figure 3:
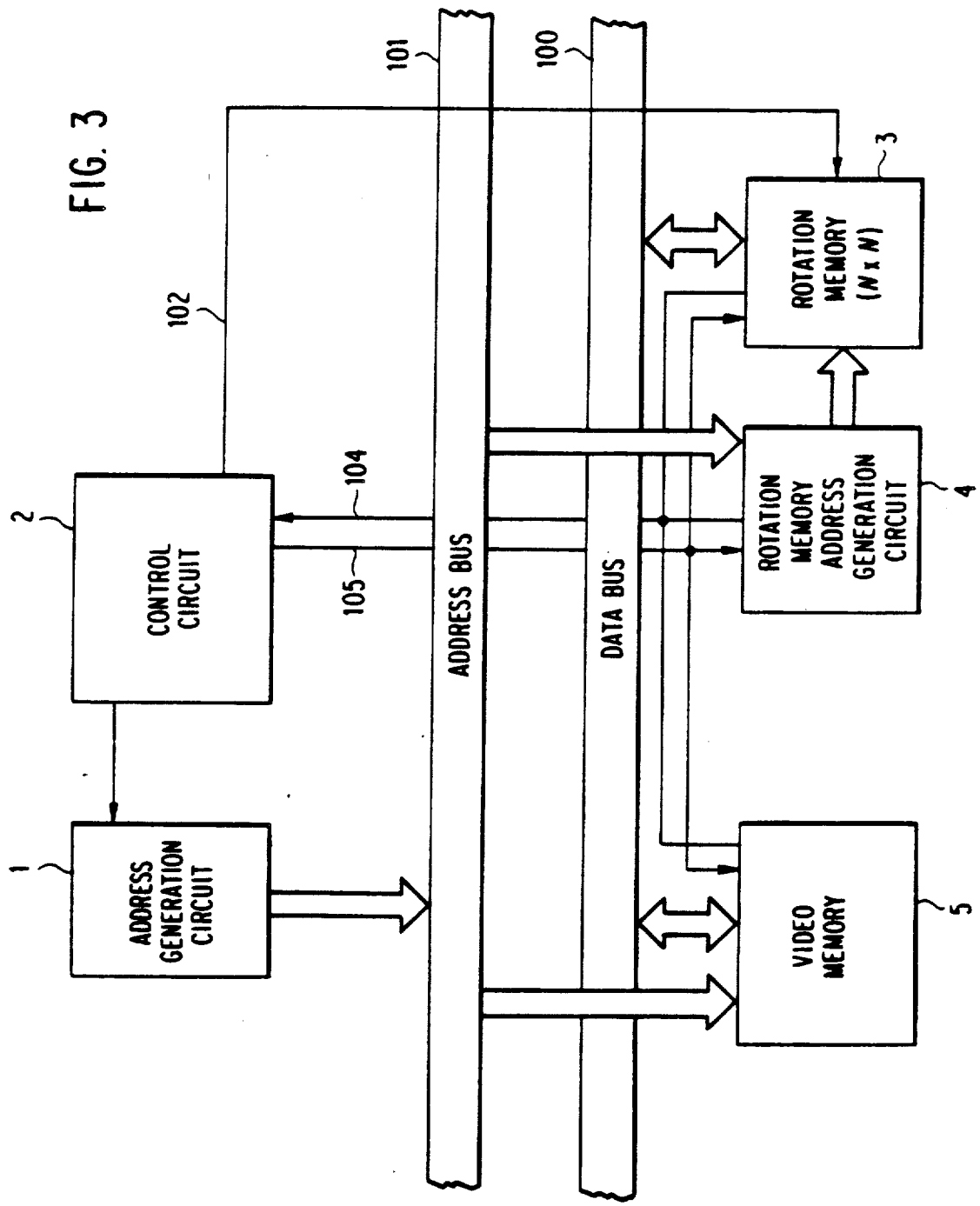
FIG. 3 is a block diagram showing an information transfer apparatus for transferring an information from a source area of a video memory to a destination area of that memory according to an embodiment of the present invention.

FIG. 3 is a block diagram of a block transfer apparatus according to an embodiment of the present invention. The apparatus includes an address generation circuit 1, a control circuit 2, a rotation memory 3, a rotation memory address generation circuit 4 and a video memory 5. The address generation circuit 1 produces source addresses of a source area and destination addresses of a destination area. The control circuit 2 is coupled to the address generation circuit 1, the rotation memory 3, the rotation memory address generation circuit 4 and the video memory 5 for controlling them as described hereinafter. The rotation memory 3 has N×N bits as same as that of the prior art. The rotation memory address generation circuit 4 is coupled to the rotation memory 3 and generates addresses to be applied to the rotation memory 3. The address generation circuit 1, the rotation memory address generation circuit 4 and the video memory 5 are coupled by an address bus 101 with each other. Further, the video memory 5 is coupled to the rotation memory 3 by a data bus 100. The video memory 5 may be the same memory as that used in the prior art.

Figure 5:
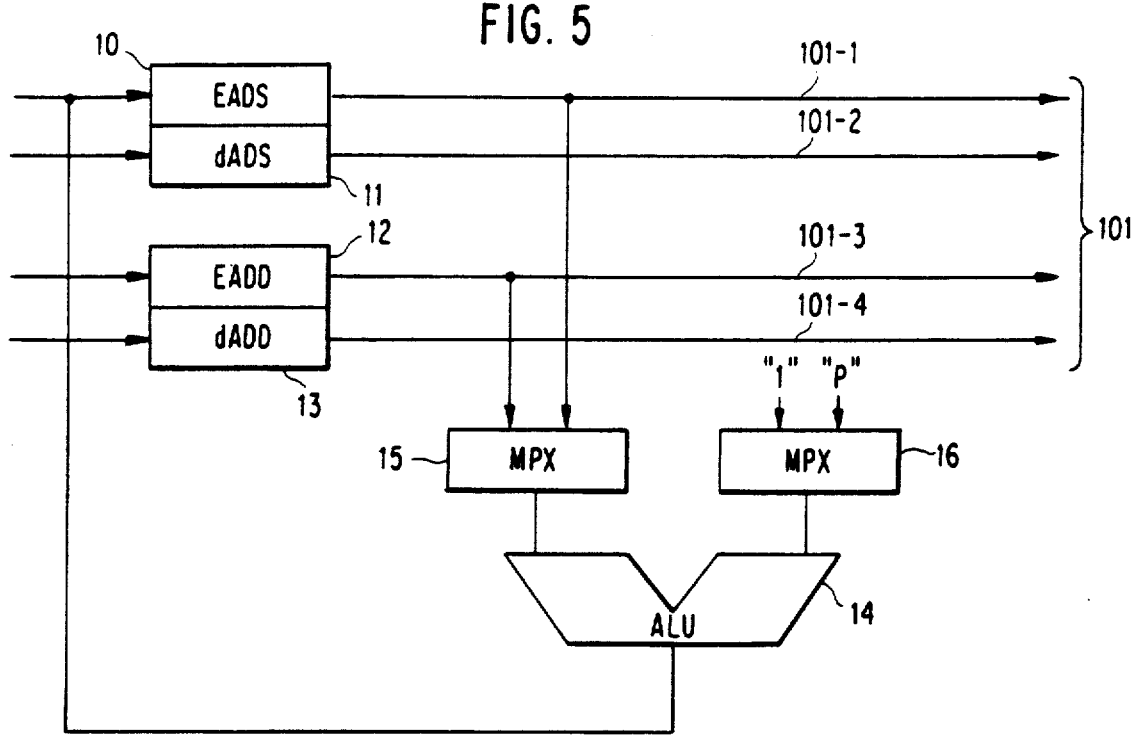
FIG. 5 is a diagram showing an address generation circuit of FIG. 3.

FIG. 5 is an internal block diagram of the address generation circuit 1. The circuit 1 includes a word register 10 storing a word designating portion of a source address, a bit register 11 storing a bit designating portion of the source address, a word register 12 storing a word designating portion of a destination address, a bit register 13 storing a bit designating portion of the destination address, an arithmetic logic unit (ALU) 14, a multiplexer 15 selecting one of two registers 10 and 12, and a multiplexer 16 selecting either a data "1" or a data "P". The data "P" represents the number of words in a horizontal direction of the video memory. The ALU 14 adds an output of the multiplexer 15 with an output of the multiplexer 16, and the result is entered into either the word register 10 or the word register 12. The address bus 101 contains word address buses 101-1 and 101-3 and bit address buses 101-2 and 101-4.

Figure 6:
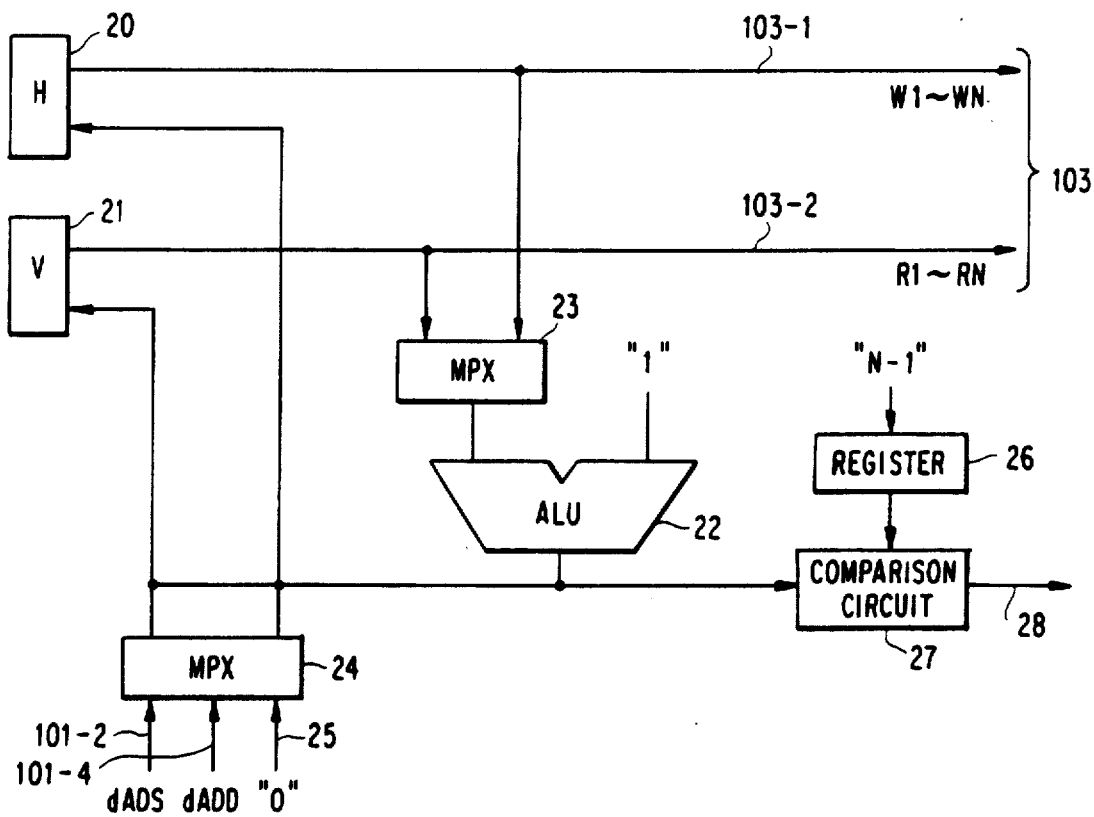
FIG. 6 is a diagram showing a rotation memory address generation circuit of FIG. 3.

FIG. 6 is an internal block diagram of the rotation memory address generation circuit 4 having a row address register (H) 20, a column address register 21, a multiplexer 23 selecting one of the two registers 20 and 21, an arithmetic logic unit (ALU) 22 adding one of a row address and a column address to "1", a multiplexer 24 selecting one of the bit designating portion (dADS) of the source address, the bit designating portion (dADD) of the destination address and "0", a register 26 storing "N-1" (the number of bits in a word), and a comparison circuit 27 comparing a content of the register 26 with an output of the ALU 22. A row address and a column address are applied to the rotation memory 3 through a row address bus 103-1 and a column address bus 103-2, respectively.

Figure 7:
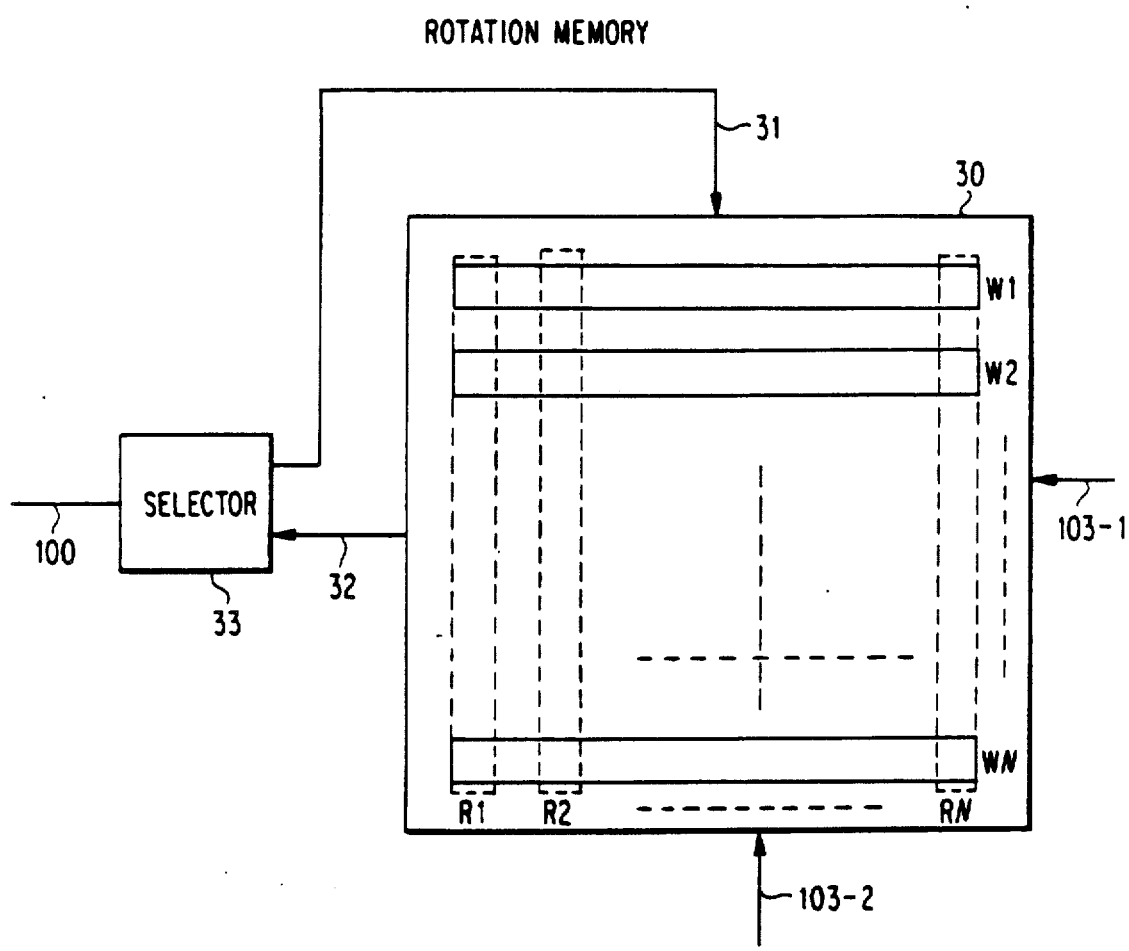
FIG. 7 is a diagram showing a rotation memory of FIG. 3, which is used as a subsidiary memory (second memory)

FIG. 7 is an internal block diagram of the rotation memory 3 having a memory cell array 30 of N bits ×N bits (N rows R1 to RN and N columns W1 to WN), an input data bus 31, an output data bus 32, and a selector 33 coupling either the input data bus 31 or the output data bus 32 to the data bus 100 according to a read/write mode. The memory cell array 30 can be accessed in both the row direction and the column direction.

Figure 8:
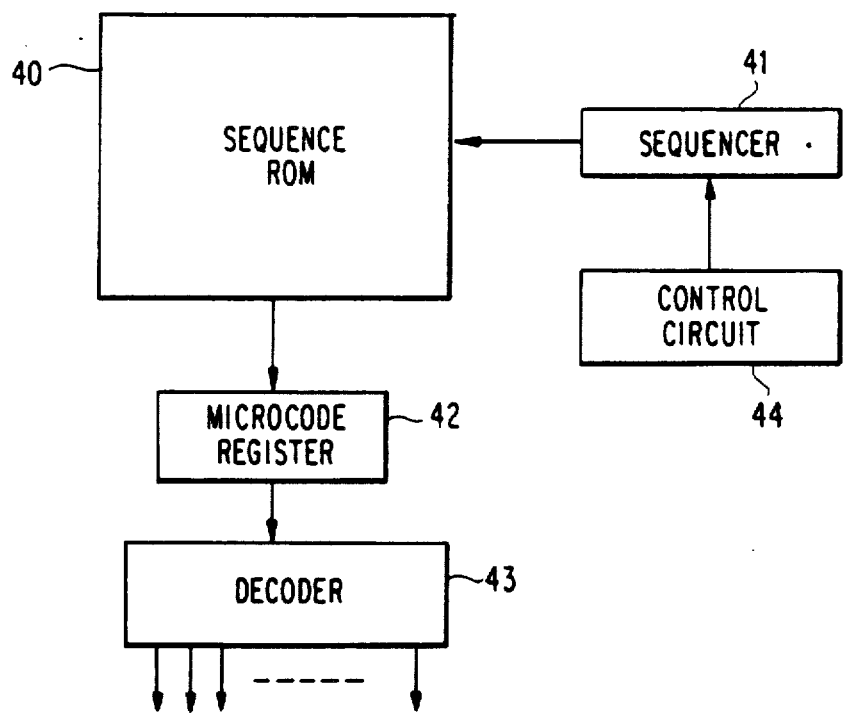
FIG. 8 is a diagram showing a control circuit of FIG. 3.

FIG. 8 is an internal block diagram of the control circuit 2 which includes a sequence memory (ROM) 40 storing a plurality of microcodes necessary to a block transfer, a sequencer 41 addressing the ROM 40, a microcode register 42, a decoder 43 and a sequencer control circuit 44.

Figure 9:
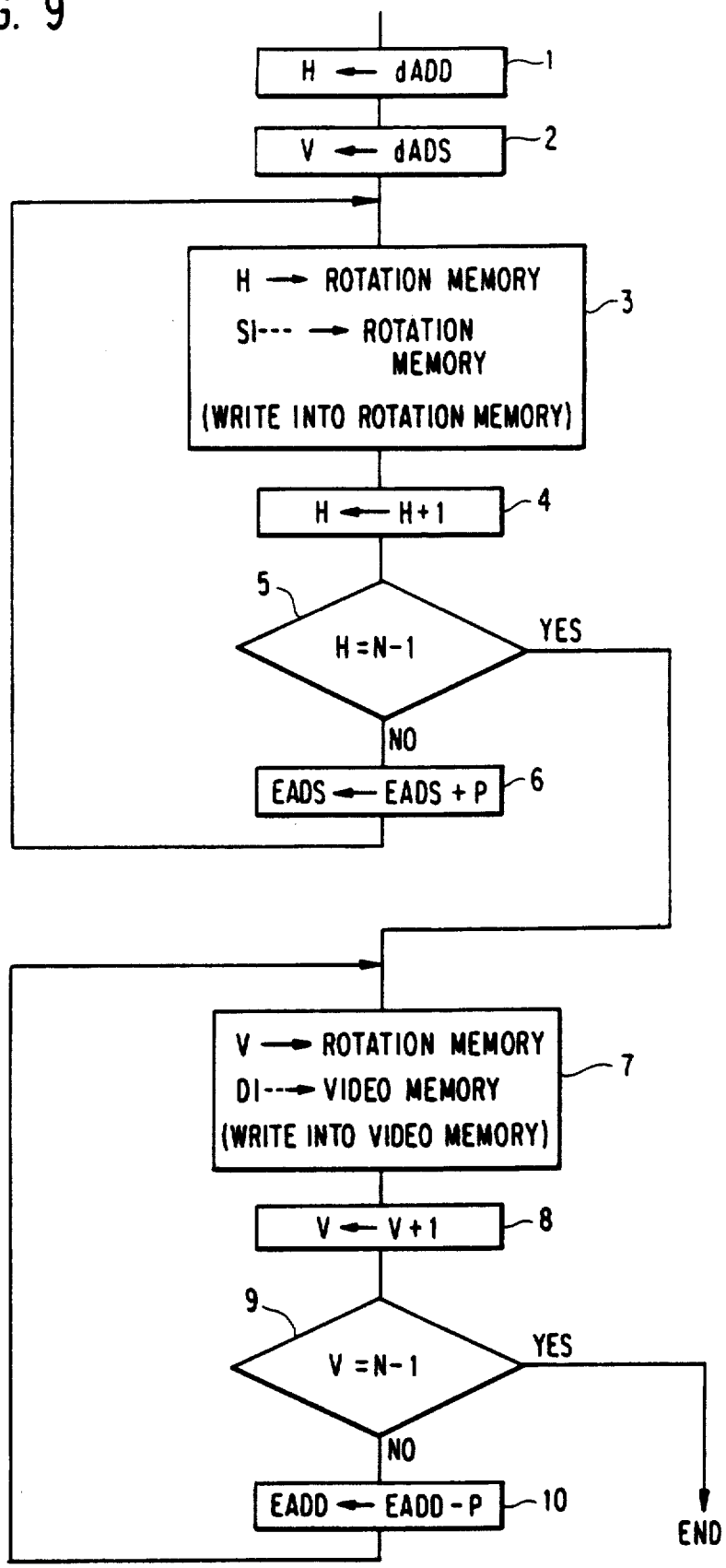
FIG. 9 is a diagram showing a flow chart for a block transfer according to the present invention.

In the case that as shown in FIG. 1 the information of the source area A is rotated by 90° and is transferred to the destination area B, operations of the apparatus in FIG. 3 are as follows:

At an initial state, a host processor (not shown) enters the source address designating the bit position (SP) into the address generation circuit 1. The word designating portion (EADS) and the bit designating portion (dADS) of the source address are set into the registers 10 and 11, respectively. Further, the host processor enters the designation address desginating the bit position (DP) into the circuit 1. The word designating portion (EADD) and the bit designating portion (dADD) of the destination address are set into the registers 12 and 13, respectively. Thereafter operations shown in FIG. 9 are performed as follows:

A content (dADD) of the bit designating portion (bit address) set in the register is applied to the row address register (H) 20 through the bus 101-4 (step 1). A content (dADS) of the bit designating portion (bit address) set in the register 11 is applied to the column address register (V) 21 through the bus 101-2 (step 2). Thereafter a content (EADS) of the word designating portion in the register 10 is applied to the video memory 5 through the bus 101-1, whereby the word containing the bit (SP) is read out of the video memory 5. The read-out word data is applied to the rotation memory 3 through the data bus 100. At this time, the content (dADD) of the destination address in the H register 20 is applied to the rotation memory 3 via the bus 103-1. Thus, the read-out word data is written at the location in the array 30 designated by dADD (step 3). Next, the content of the H register 20 is incremented by 1 by the ALU 22, and the result (dADD+1) is set in the H register (step 4). Further, the result (dADD+1) is compared with the content (N-1) of the register 26 by the comparison circuit 27. If the result does not coincide with the content (N-1), the word designating portion (EADS) of the register 10 is added by P by the ALU 14, and the result (EADS+P) is set in the register 10 (step 6). Then an operation is returned to the step 3. The steps 3 to 6 are successively repeated till the content of the H register 20 becomes N-1. When the content of the H register 20 has been N-1, the comparison circuit 27 generates a signal 28. Thus, a reading operation of one block of the source area A is terminated. When the signal 28 is generated, an operation is shifted to a step 7.

In the step 7, the column address of the V register 21, that is dADS of the bit designating portion of the source address, is applied to the rotation memory via the bus 103-2, whereby a word in the column direction is read out of the array 30 and is transferred to the data bus through the bus 32 and the selector 33. While the content of the register 12, that is EADD of the word designation portion of the destination address, is applied to the video memory 5 through the bus 101-3. Thus, the word read out of the rotation memory 3 is written into the destination area B of the video memory 5 (step 7). Thereafter the content of the V register 21 is incremented by 1 by the ALU 22, and the result (dADS+1) is set into the V register 21 (step 8). The result (dADS+1) is compared with the content N-1 of the register 26 by the comparison circuit 27 to check whether the result coincides with N-1. When the singal 28 is not generated, the content of the register 12, that is EADD of the word designating portion of the destination address, is subtrated by P by the ALU 14. The result (EADD-P) is set in the register 12 (step 10). An operation is returned to the step 7. The steps 7 to 10 are successively repeated till the signal 28 is generated. When the signal 28 is generated, a block transfer of one block is terminated.

Figure 10:
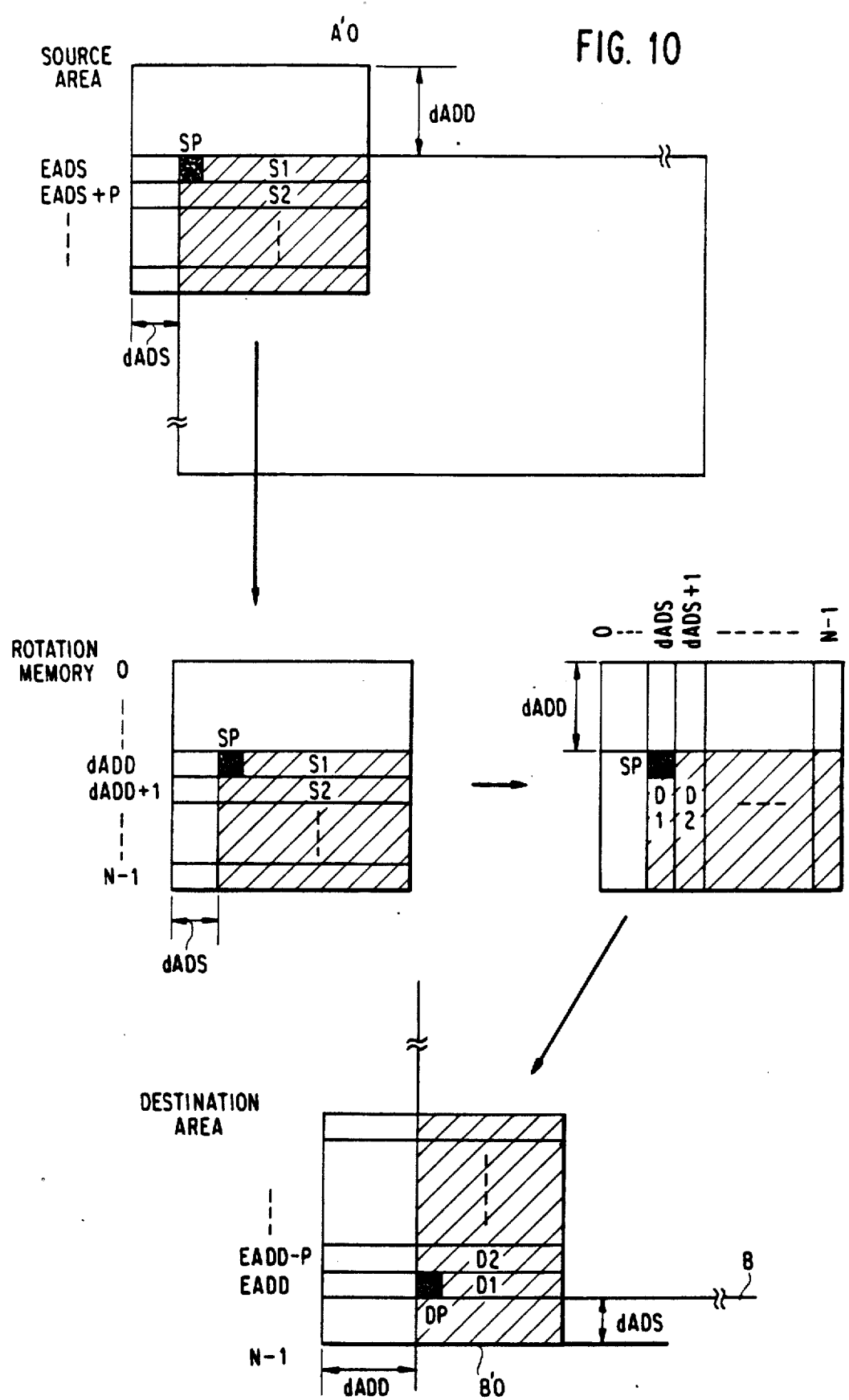
FIG. 10 is a diagram showing a block transfer using the rotation memory according to the present invention.

The above-mentioned operations will be explained with reference to FIG. 10. The bit position (SP) of the source area A is designated by the word address (EADS) and the bit address (dADS), while the bit position (DP) of the destination area B is designated by the word address (EADD) and the bit address (dADD). Here, the EADS and the EADD are the word designating portions of the source address and the destination address, respectively. The dADS and the dADD are the bit designating portions of the source and destination addresses, respectively. By applying the EADS to the video memory 5, the word containing SP is read out thereof (the step 3). This word is written into the rotation memory 3 according to the dADD. At this time, it should be noted that no word is written at 0 to dADD-1 of the rotation memory 3. The writing operation is successively performed from dADD to N-1 (the steps 3 to 6) in the row direction. Thereafter, the reading operation for the rotation memory 3 is performed, the dADS is applied to the rotation memory 3. The reading operation is performed from dADS to N-1 in the column direction. Each word read out of the rotation memory 3 is written into the video memory 5 according to EADD, EADD-P, . . . Thus, a block A'O is rotated by 90° and is transferred to a block B'O.

As described above, according to the present invention a block transfer can be performed at a high speed without a shift operation. Further, all of the effective information S1, S2, . . . in the block A'O is transferred to the block B'O as the effective information D1, D2, . . ., so that there is no sticky information. Therefore, the writing operation for the destination area B can be performed at a high speed.

In the present invention, when a right-hand block adjacent to the block A'O is transferred, a word address EADS+N is used. When a block adjacent downwardly to the block A'O is transferred, the content of the register 10÷P is used as the word address. Further, when a start bit portion of a block to be transferred coincides with a boundary of a word, "0" is selected by the multiplexer 24 as dADS and dADP.

Figure 4:
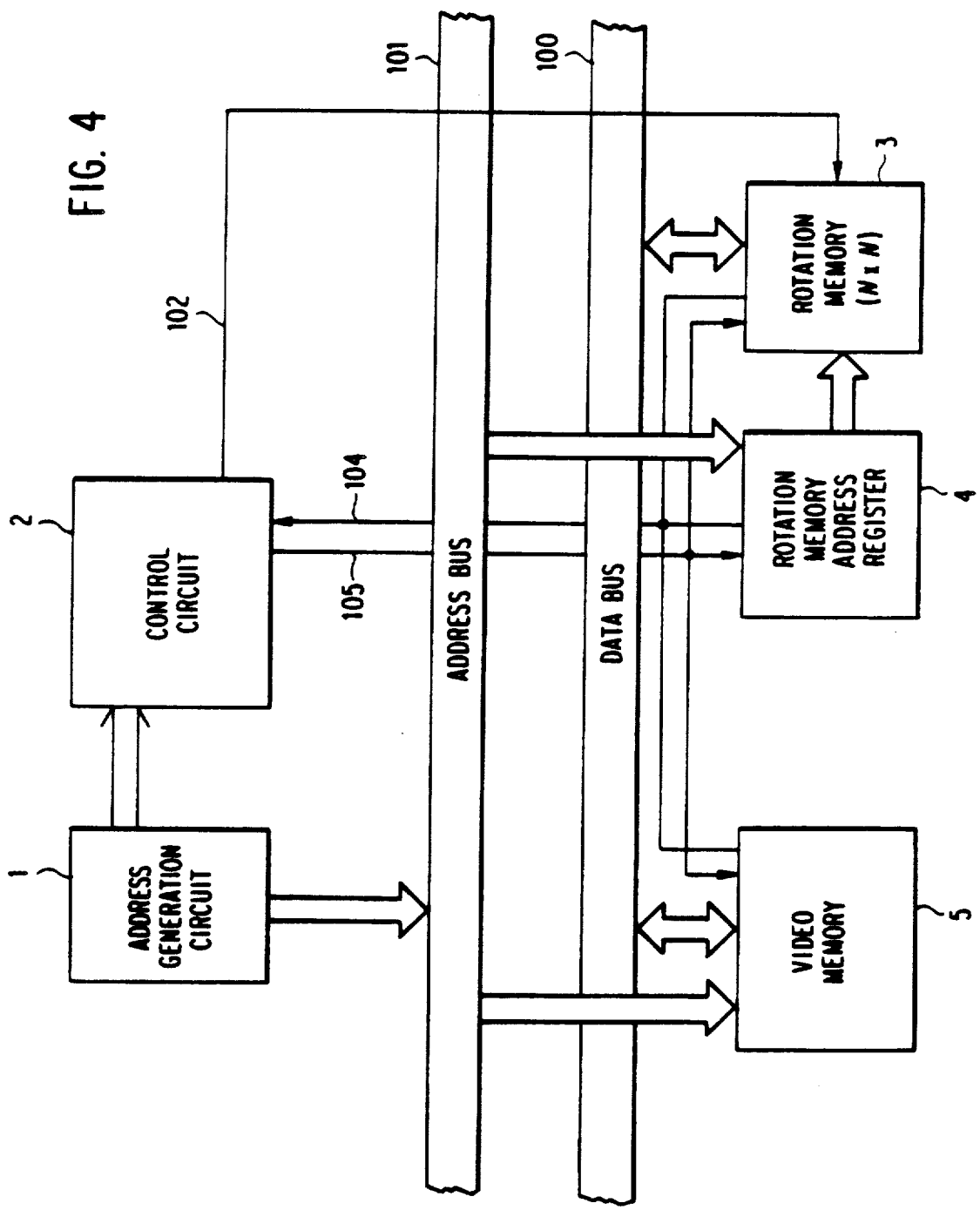
FIG. 4 is a block diagram of an information transferring apparatus according to another embodiment of the present invention.

The apparatus shown in FIG. 3 can be modified such as FIG. 4 in which the hardward circuits except for the H and V registers in the rotation memory address generation circuit 4 are implied in the control circuit 2 and the address generation circuit 1 is coupled to the address bus 101 via the control circuit 2. In FIGS. 1 and 2, a signal 102 is a switching signal to be applied to the rotation memory 3 for designating the row direction and the column direction. A signal 105 is a read/write control signal to be applied to the video memory 5 and the rotation memory 3 from the decoder 43. A signal 104 is applied to the control circuit to inform termination of a block transfer.

What is claimed is:

1. An information transferring apparatus for transferring information from a source area to a destination area of a memory wherein a boundary of at least one of said source area and said destination area does not coincide with normal memory word boundaries, said apparatus comprising:

a first memory having a source area in which information to be transferred is stored and a destination area in which the information stored in said source area is to be written, said source area being accessed by a source address having an upper source address portion and a lower source address portion where said lower source address portion is indicative of a range of displacement of a boundary of said source area from a normal memory word boundary, and said destination area being accessed by a destination address having an upper destination address portion and a lower destination address portion where said lower destination address portion is indicative of a range of displacement of a boundary of said destination area from a normal memory word boundary;

a second memory coupled to said first memory for temporarily storing the information stored in said source area of said first memory; and a control circuit coupled to said first memory and said second memory and having a first reading means coupled to said first memory for reading the information out of said source area by using said upper source address portion of said source address, a first writing means coupled to said second memory for writing the read-out information into said second memory in a row direction by using said lower destination address portion of said destination address, a second reading means coupled to said second memory for reading the information out of said second memory in a column direction by using said lower source address portion of said source address, and a second writing means coupled to said first memory for writing the information read out of said second memory into said destination area of said first memory by using said upper destination address portion of said destination address.

2. An apparatus as claimed in claim 1, wherein each of said source and destination areas includes a plurality of words each consisting of a plurality of bits, said upper source address portion and said lower source address portion of said source address designating one of the words of said source area and one of the bits of the word designated by said upper source address portion, respectively, said upper destination address portion and said lower designation address portion of said destination address designating one of the words of said destination area and one of the bits of the word designated by said upper destination address portion, respectively.

3. An apparatus as claimed in claim 2, wherein the information read out of said source area in said first memory is written into said second memory in a row direction by said lower destination address portion, the information written into said second memory being read out thereof in a column direction by said lower source address portion.

4. An apparatus as claimed in claim 2, wherein the information read out of said source area in said first memory is written into said second memory in a column direction by said lower destination address portion, the information written into said second memory being read out thereof in a row direction by said lower source address portion.

5. An information transferring apparatus for transferring information from a first block area to a second block area of a memory wherein a boundary of at least one of said first block area and said second block area does not coincide with normal memory word boundaries, said apparatus comprising a first memory containing a first block area having a plurality of words and a second block area having a plurality of words, each word consisting of a plurality of bits, a first word address generator for generating a first block word address designating one of said plurality of words in said first block area, a first bit address generator for generating a first block bit address designating one of said plurality of bits in the word designated by said first block word address where said first block bit address is indicative of a range of displacement of a boundary of said first block area from a normal memory word boundary, a second word address generator for generating a second block word address designating one of said plurality of words in said second block area, a second bit address generator for generating a second block bit address designating one of said plurality of bits in the word designated by said second block word address where said second block bit address is indicative of a range of displacement of a boundary of said second block area from a normal memory word boundary, a second memory, a first reading circuit coupled to said first word address generator and said first memory for reading a word designated by said first block word address out of said first block area in said first memory, a first writing circuit coupled to said first reading circuit, said second bit address generator and said second memory for writing the read-out word into said second memory in a row direction by said second block bit address, a second reading circuit coupled to said first bit address generator and said second memory for reading the word written into said second memory out of said second memory in a column direction by said first block bit address, and a second writing circuit coupled to said second word address generator, said second reading circuit and said first memory for writing the word read out of said second memory into said second block area of said first memory by said second block word address.

6. A method of transferring information stored in a first memory area to a second memory area via a subsidiary memory wherein a boundary of at least one of said first memory area and said second memory area does not coincide with normal memory word boundaries, said method comprising the steps of:

providing, for accessing said first memory area, a source address having an upper source address portion and a lower source address portion where said lower source address portion is indicative of a range of displacement of a boundary of said first memory area from a normal memory word boundary;

providing, for accessing said second memory area, a destination address having an upper destination address portion and a lower destination address portion where said lower destination address portion is indicative of a range of displacement of a boundary of said second memory area from a normal memory word boundary;

reading information out of said first memory area using said upper source address portion;

writing the information read out of said first memory area by said upper source address portion into said subsidiary memory in a row direction using said lower destination address portion;

reading the information written into said subsidiary memory out of said subsidiary memory in a column direction using said lower source address portion; and writing the information read out of said subsidiary memory by said lower source address portion into said second memory area using said upper destination address portion.

7. An information transferring apparatus for transferring information from a source area to a destination area of a memory wherein a boundary of at least one of said source area and said destination area does not coincide with normal memory word boundaries, said apparatus comprising:

main memory means divided into a plurality of words defined by normal memory word boundaries and having a plurality of bits, a first portion of said plurality of words being used as a source area in which information to be transferred is stored, the information in each source word being associated with both a source word address designating the respective memory location of the source word, and a source bit address designating the first bit where the information is stored in said source word and being indicative of a range of displacement of a boundary of said source area from a normal memory word boundary, and a second portion of said plurality of words being used as a destination word area into which information stored in said source word area is to be transferred, each destination word being associated with both a destination word address designating the respective memory location of the destination word, and a destination bit address designating the first bit where the transferred information is to be stored in said destination word and being indicative of a range of displacement of a boundary of said destination area from a normal memory word boundary;

transfer memory means coupled to said main memory means for temporarily storing the information being transferred from said source word area to said destination word area, said transfer memory means having $N \times N$ bits representing N rows and N columns each having N bits;

control means coupled to said main memory means and said transfer memory means for:

reading the information out of sequential source words contained within an $N \times N$ bit area of said main memory using said source word addresses;

writing the read-out information into respective sequential rows of said transfer memory means, beginning with a row having an address corresponding to said destination bit address;

reading the information out of sequential columns of said transfer memory means, beginning with a column having an address corresponding to said source bit address; and writing the information read-out of said transfer memory means into sequential destination words using said destination word address.

8. A method of transferring information stored in a first memory area to a second memory area via a temporary memory area wherein a boundary of at least one of said first memory area and said second memory area does not coincide with normal memory word boundaries, said method comprising the steps of:

providing a main memory means divided into a plurality of words defined by normal memory word boundaries and having a plurality of bits, a first portion of said plurality of words being used as a source word area in which information to be transferred is stored, the information in each source word being associated with both a source word address designating the respective memory location of the source word, and a source bit address designating the first bit where the information is stored in said source word and being indicative of a range of displacement of a boundary of said source word area from a normal memory word boundary, and a second portion of said plurality of words being used as a destination word area into which information stored in said source word area is to be transferred, each destination word being associated with both a destination word address designating the respective memory location of the destination word, and a destination bit address designating the first bit where the transferred information is to be stored in said destination word and being indicative of a range of displacement of a boundary of said destination word area from a normal memory word boundary;

providing transfer memory means coupled to said main memory means for temporarily storing the information being transferred from said source word area to said destination word area, said transfer memory means having $N \times N$ bits representing N rows and N columns, each having N bits;

reading the information out of sequential source words contained within an $N \times N$ bit area of said main memory using said source word addresses;

writing the read-out information into respective sequential rows of said transfer memory means, beginning with a row having an address corresponding to said destination bit address;

reading the information out of sequential columns of said transfer memory means, beginning with a column having an address corresponding to said source bit address; and writing the information read-out of said transfer memory means into sequential destination words using said destination word addresses.

* * * * *